United States Patent [19]

Nogues et al.

[11] Patent Number: 5,071,674

[45] Date of Patent: Dec. 10, 1991

[54] METHOD FOR PRODUCING LARGE SILICA SOL-GELS DOPED WITH INORGANIC AND ORGANIC COMPOUNDS

[75] Inventors: Jean-Luc Nogues; Larry L. Hench, both of Gainesville, Fla.; Shi-Ho Wang, Newbury Park, Calif.

[73] Assignee: The University of Florida, Gainesville, Fla.

[21] Appl. No.: 611,490

[22] Filed: Nov. 6, 1990

Related U.S. Application Data

[63] Continuation of Ser. No. 443,158, Nov. 30, 1989, abandoned.

[51] Int. Cl.[5] ............................................. B05D 3/12
[52] U.S. Cl. .................................... 427/57; 427/243; 427/282; 427/294; 427/376.6; 427/379; 427/404; 427/407.1; 427/427; 427/443.2
[58] Field of Search ................. 427/57, 243, 282, 294, 427/376.6, 379, 404, 407.1, 427, 443.2

[56] References Cited

U.S. PATENT DOCUMENTS

| | | | |
|---|---|---|---|
| 4,286,024 | 8/1981 | Yoldas | 428/446 |
| 4,389,233 | 6/1983 | Kurosaki et al. | 65/31 |
| 4,400,306 | 8/1983 | Dria et al. | 252/431 |
| 4,495,297 | 1/1985 | Puyane et al. | 501/12 |
| 4,765,818 | 8/1988 | Che et al. | 65/18 |
| 4,769,477 | 9/1988 | Bergna | 549/259 |
| 4,770,671 | 9/1988 | Monroe et al. | 51/293 |
| 4,777,311 | 10/1988 | Sikkenga et al. | 585/415 |
| 4,778,826 | 10/1988 | Jezl et al. | 518/703 |
| 4,788,164 | 11/1988 | Che et al. | 501/39 |
| 4,788,373 | 11/1988 | Nubel | 585/525 |
| 4,789,533 | 12/1988 | Baiker et al. | 423/239 |
| 4,800,180 | 1/1989 | McAllister et al. | 501/88 |
| 4,810,674 | 3/1989 | Che et al. | 501/12 |
| 4,812,155 | 3/1989 | Kyoto et al. | 65/3.12 |
| 4,840,653 | 6/1989 | Rabinovich | 65/3.12 |
| 4,849,378 | 7/1989 | Hench et al. | 501/12 |
| 4,851,023 | 7/1989 | Gonzales-Oliver | 65/3.14 |
| 4,851,270 | 7/1989 | Che et al. | 428/1 |
| 4,851,373 | 7/1989 | Hench et al. | 501/12 |
| 4,878,224 | 10/1989 | Kuder et al. | 372/53 |
| 4,883,779 | 11/1989 | McAllister et al. | 501/88 |
| 4,898,755 | 2/1990 | Che et al. | 427/389.7 |

OTHER PUBLICATIONS

Berry et al., "Characterisation of Doped Sol-Gel Derived Silica Hosts for Use in Tunable Glass Lasers," J. Phys. D: Appl. Phys. (1989), pp. 1419-1422.

Pacheco et al., "A Solid-State Flashlamp-Pumped Dye Laser Employing Polymer Hosts," *Proceedings of the International Conference on Lasers* '87, (1987), pp. 300-335.

Avnir et al., "The Nature of the Silica Cage As Reflected by Spectral Changes and Enhanced Photostability of Trapped Rodamine 6G," *The Journal of Physical Chemistry*, Vol. 88, No. 24, (1984), pp. 5956-5959.

*Primary Examiner*—Bernard Pianalto
*Attorney, Agent, or Firm*—Finnegan, Henderson, Farabow, Garrett & Dunner

[57] ABSTRACT

A method of producing doped, monolithic objects of silica in a wide variety of shapes which comprises impregnating a stabilized silica sol-gel monolith with a doping solution having therein a wide range of inorganic or organic dopants to achieve unique physical properties, such as specific optical absorption bands or scintillation properties.

21 Claims, 3 Drawing Sheets

DOPANT 1

DOPANT 2

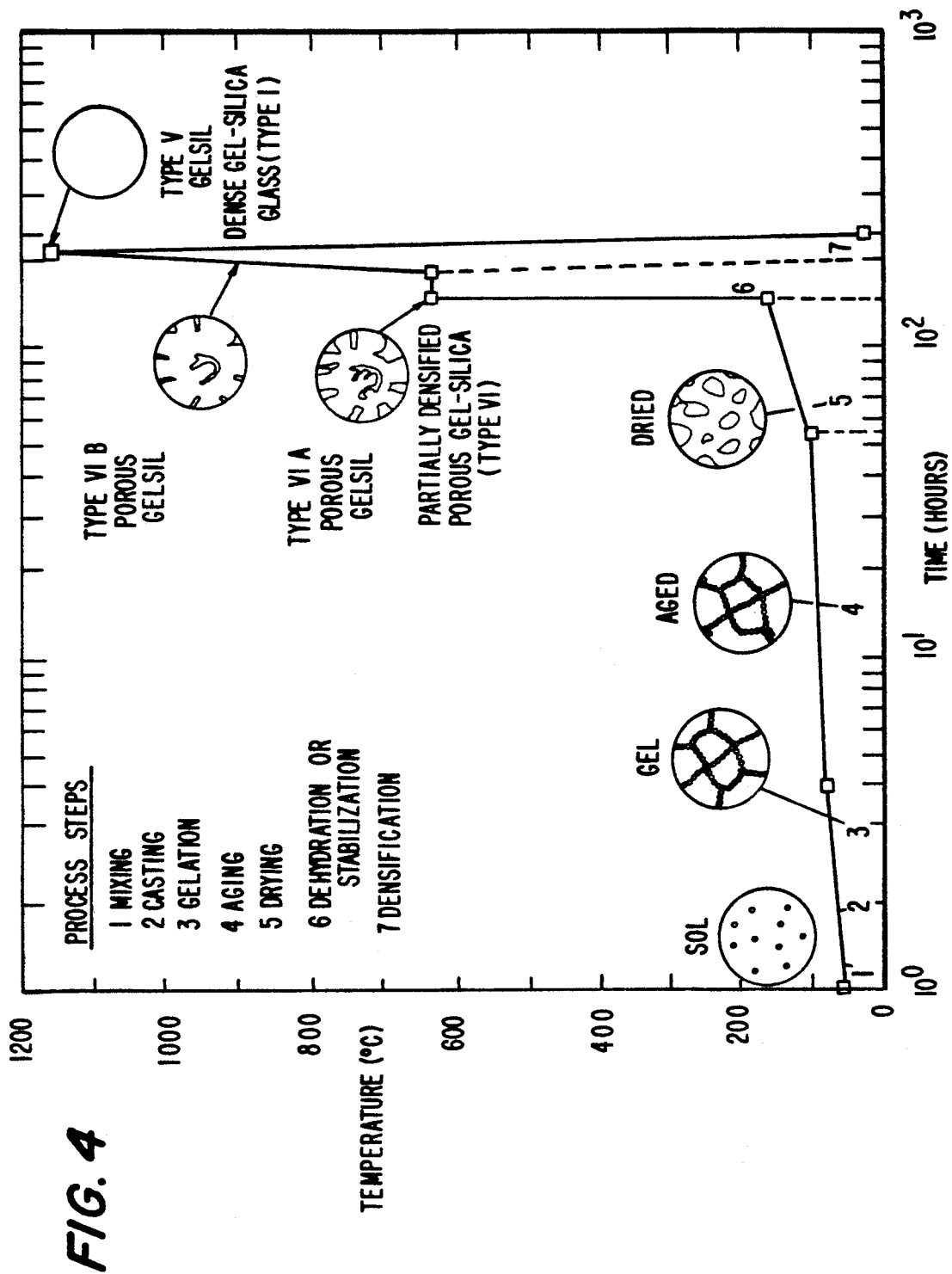

METHOD FOR PRODUCING LARGE SILICA SOL-GELS DOPED WITH INORGANIC AND ORGANIC COMPOUNDS

This invention was made with U.S. Government support under Contract No. F49620-85-C-0079 awarded by the U.S. Air Force. The U.S. Government has certain rights in this invention.

This application is a continuation of application Ser. No. 443,158, filed Nov. 30, 1989, now abandoned.

BACKGROUND OF THE INVENTION

Traditional glass manufacture requires very high temperatures which preclude adding organic compounds to the glass structure or maintaining elements in their metallic or partially reduced states. The long homogenization times at high temperature normally used in traditional glass manufacturing also make difficult the retention of compounds or elements having high vapor pressures within a glass structure. Also, traditional glass manufacturing requires that any dopant compound or element used must be mixed in the starting batch.

Consequently, it is often difficult to achieve homogeneity on a molecular scale using traditional glass melting procedures, and it is nearly impossible to produce controlled gradients of additives or dopants. Moreover, it is necessary to clean the melting and forming equipment after processing each composition of glass made by traditional methods in order to avoid contamination of subsequent compositions. Consequently, the size of a production run must be quite large in order to be economical. Furthermore, the addition of multiple dopants in traditional glasses is restricted because the dopants often chemically interact with each other, with the glass matrix and even with the crucible itself at these high temperatures.

All of the above complications, which are typically encountered in the doping of glass compositions, are dramatically increased when the glass is pure silica because the melting point of pure silica is 1713° C. and temperatures of 2000° C. are often required to process the pure silica glass.

SUMMARY OF THE INVENTION

The present invention teaches a method of using a sol-gel process to prepare and dope a pure silica monolith, thereby eliminating most, if not all, of the above complications typically encountered with the compositional doping of glass. The present invention is drawn to a method of fabricating monolithic silica objects having dopants therein, comprising the steps of (a) preparing at least one doping solution comprising a solvent having dissolved therein one or more inorganic or organic dopants;

(b) preparing an ultraporous, dried silica-gel matrix;

(c) stabilizing the dried silica-gel matrix by subjecting the dried silica-gel matrix to a heat treatment to produce an ultraporous, stabilized silica-gel monolith;

(d) contacting the ultraporous, stabilized silica-gel monolith with at least one of the doping solutions to produce a doped silica-gel monolith;

(e) drying the doped silica-gel monolith.

The process according to the present invention may be used to produce glass optical filters, glass lasers, graded refractive index lenses, micro-optical arrays, waveguides, optical computers, non-linear optical elements, scintillation counters, polarizing filters, fiber optics, electro-optical components and other glass structures.

BRIEF DESCRIPTION OF THE DRAWINGS

FIG. 4. illustrates the process of making the silica-gel glass according to the present invention.

DETAILED DESCRIPTION OF THE INVENTION

Figure 1:
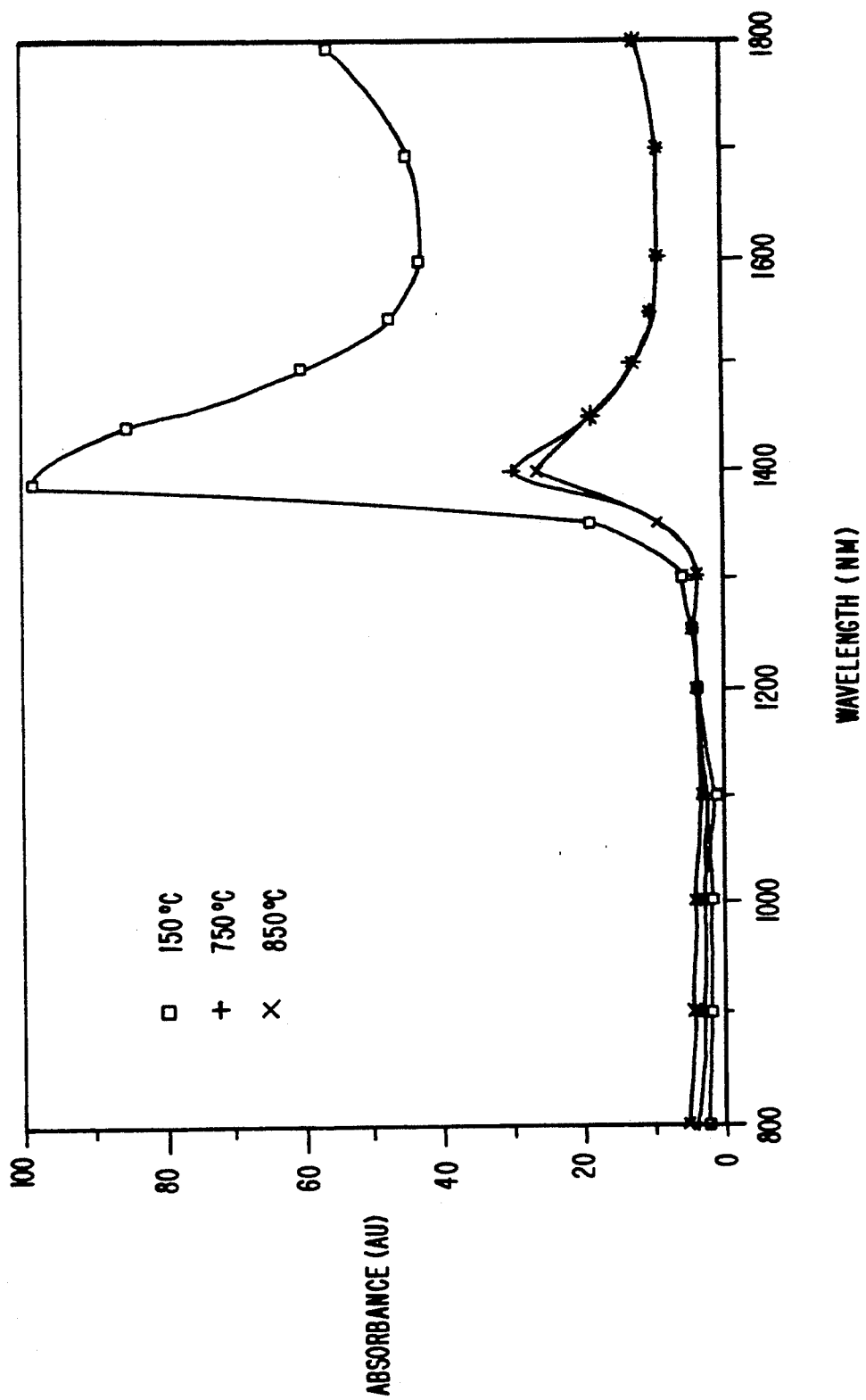
FIG. 1. illustrates the effect of the temperature of stabilization on OH$^-$ radical absorption peak.

Sol-gel objects are produced from organo-metallic compounds such as tetramethylorthosilicate (TMOS) or tetraethylorthosilicate (TEOS). When these compounds are mixed with water, a hydrolysis reaction produces a suspension of colloidal silica-based particles, called a "sol." As the reaction continues, the particles begin to link together by polycondensation. The completion of the linkage reaction results in the solution becoming rigid. This rigid state is know as a "gel" or "matrix." A drying control chemical additive ("DCCA") is sometimes employed to control the rates of hydrolysis and polycondensation in order to obtain monolithic gels and to develop an ultrastructure which allows for subsequent doping.

The initial sol is typically cast in a mold of the desired final shape. Once the gel or matrix has been formed, an aging process is carried out in which it continues to densify without drying. By-products from the process are then removed from the gel matrix structure by drying, thus producing a low density, optically transparent silica matrix called a "dried gel." After drying, a densification treatment is typically used to produce an optically transparent, stabilized silica sol-gel monolith with well-defined characteristics such as uniform pore size, a known pore surface area and a known total pore volume. Changes in process parameters are capable of influencing the characteristics of the resulting sol-gel monoliths within a very wide range.

The stabilization treatment is carried out at a temperature which produces an ultraporous structure with open porosity but with enough strength to support subsequent doping. This temperature of stabilization is lower than that required for full densification. The resulting structure is an ultraporous partially densified (or stabilized) silica-gel monolith.

The ultraporous structure produced by the sol-gel process is well adapted for being doped with different organic and inorganic dopants. Further, the physical properties of the resulting monolith are strong enough to withstand the mechanical tensions and stresses normally encountered in the doping process.

There are essentially two traditional methods for doping a silica-gel monolith with an inorganic or organic compound to produce a doped monolith. In one method, the doped monolith can be formed by mixing the dopant compound into the sol before gelation. In a second method, a doped silica-gel monolith can be prepared by the infiltration of a dopant compound into the pores of a dried gel.

Each of these methods has negative aspects. When the dopant compound is mixed into the sol before gelation, gradients are formed in the final product due to migration of the dopant to the surface of the product during the subsequent aging and drying stages. In the second method, exposure of the conventional dried gel to dopant solutions can lead to undesirable cracking of the monolith.

In the present invention, monolithic silica objects containing dopants are prepared by contacting the ultraporous surface structure of stabilized silica sol-gel monoliths with at least one dopant solution comprising a solvent having dissolved therein one or more inorganic or organic dopants. By using an ultraporous, stabilized silica-gel monolith, the following properties are obtained:

(1) a 100% pure silica matrix without unwanted organic residues, such as byproducts of the hydrolysis reaction or an organic drying control chemical additive (DCCA);

(2) an ultrastructure adapted for doping; and (3) mechanical and optical properties adequate for commercial optical applications.

The method of fabricating doped monolithic silica objects containing dopants according to the present invention is exemplified by the following steps:

(a) Preparing at least one doping solution by dissolving the desired inorganic or organic dopant compounds in a solvent. A wide range of inorganic and organic dopant compounds may be used, including:

transition elements such as Ag, Al, Au, Ba, Co, Cr, Cu, Fe, Mn, Nb, Ni, Pb, Ti, V and Zr;

rare earth elements such as Er, Ce and Nd;

nonlinear optical products such as MNA [2-methyl-4-nitroaniline], PBT [phenylenebenzobisthiazole] and poly (1,3-butanediol);

fluors such as PBD [2-phenyl-5-(4-biphenylyl)-1,3,4-oxadiazole] and p-terphenyl;

wavelength shifters such as 3-hydroxyflavone (flavanol) and butyl-PBD.

organic and inorganic optical filter dyes such as acridine orange and other color inducing dyes; and laser dyes such as Rhodamine 6-G and bis-nickel(4-dimethylaminodithiobenzil)

Solvents useful for dissolving one or more inorganic or organic dopants include water; acids such as nitric acid; hydrocarbons such as benzene, toluene and cyclohexane; hydroxy compounds such as methanol and ethanol; ethers such as methyl ether; and carbonyls such as acetone.

The concentration of the dopant in the doping solution is a function of several parameters such as temperature and solubility limits. Typically, the dopant concentration can easily be adjusted within these parameters to obtain the desired, ultimate concentration of the dopant in the final monolithic silica object. It is possible, for example, to use doping solutions with very small concentrations of dopants to prepare silica-gel monoliths with trace amounts of dopants or, on the other hand, to use concentrations up to the solubility limit of the particular solute-solvent pair being used in the doping solution.

In the case of doping with multiple dopants, sometimes a single doping solution containing all the dopants desired for the resulting doped monolith may be prepared. If the same solvent cannot be used for different dopants, several different doping solutions are then prepared. In this event, the doping of the stabilized monolith can be carried out in several stages.

(b) Preparing an ultraporous dried silica-gel matrix to be contacted with the doping solution or solutions. The average pore radius of the matrix is preferably adapted to the particular dopant compounds to be used. Specifically, the pore radius should be larger than the radius of the doping molecule. The pore distribution in the matrix may also be designed for local molecular distribution of dopants, including gradients if desired. By controlling the matrix structure as it is being formed, the overall characteristics of the resulting doped monolith, such as dopant density may be changed.

In addition to a pure silica-gel matrix, it is sometimes desirable to use silica-gel matrices having additional materials incorporated therein to achieve other desired effects.

(c) Stabilizing the dried silica-gel matrix by subjecting the matrix to a heat treatment. The heat treatment may be performed at a temperature of about 150° C. to about 1150° C. The temperature of the heat treatment is chosen to achieve an ultrastructure having the desired porosity to receive the dopant yet with enough strength to withstand the subsequent doping.

Preferably, the heat treatment is performed at a temperature of about 500° to about 1150° C. in air with control of the partial pressure of the evaporating species $(0.1 \leq Pp \leq 0.8)$. This heat treatment produces an ultraporous, stabilized silica-gel monolith which is strong enough to resist cracking during the subsequent doping step. Furthermore, subjecting the dried silica-gel matrix to a temperature of at least about 500° C. ensures the elimination of any undesired organic residues within the silica-gel matrix. The resulting ultraporous monolith preferably possesses the following characteristics:

microhardness > 100 DPN flexural strength > 30 MPa compression strength > 200 MPa.

During this stabilization step, the specific surface area of the matrix can decrease from about 750 m²/g to about 50 m²/g without changing the mean pore radius (Pr) more than about 20%. Further, the non-bridging oxygen content decreases drastically during the conversion from the partially dried matrix to the stabilized monolith. FIG. 1 illustrates the effect of the temperature of stabilization on the OH⁻ radical absorption (stretching overtone) peak. The intensity of the peak around 1400 nm, proportional to the OH⁻ concentration in the gel, decreases drastically between 150° C. (partially dried matrix) and 750° or 850° C. (stabilized monolith). The stabilizing heat treatment induces a condensation reaction between the OH⁻ radicals, resulting in the formation of Si-O-Si bonds. As a consequence, the strength of the silica-gel structure increases significantly.

(d) Contacting the ultraporous, stabilized silica-gel monolith with at least one of the doping solutions. The doping solution may be brought into contact with the silica in a number of ways:

(1) Where complete impregnation is desired, the contacting step may be carried out under several different conditions as follows:

completely or partially immersing the ultraporous stabilized silica-gel monolith in a doping solution at ambient pressure and at a temperature between the freezing point and the evaporation point of the doping solution;

completely or partially immersing the ultraporous monolith in a doping solution under pressure or in a vacuum for faster impregnation or to eliminate potential interfacial bubbles;

completely or partially immersing the ultraporous monolith in a doping solution while subjecting the dopant solution to mechanical or ultrasonic stirring to obtain faster impregnation or better homogeneity.

Complete impregnation of the stabilized silica-gel matrix may be achieved through partial immersion due to capillary action between the silica-gel and the dopant solution.

The duration of the contacting step can vary widely and is a function of a number of different characteristics of the doping solution such as the viscosity of the doping solution, the size of the monolith to be doped and the conditions under which the contacting step is carried out, such as temperature, stirring, etc.

Figure 2:
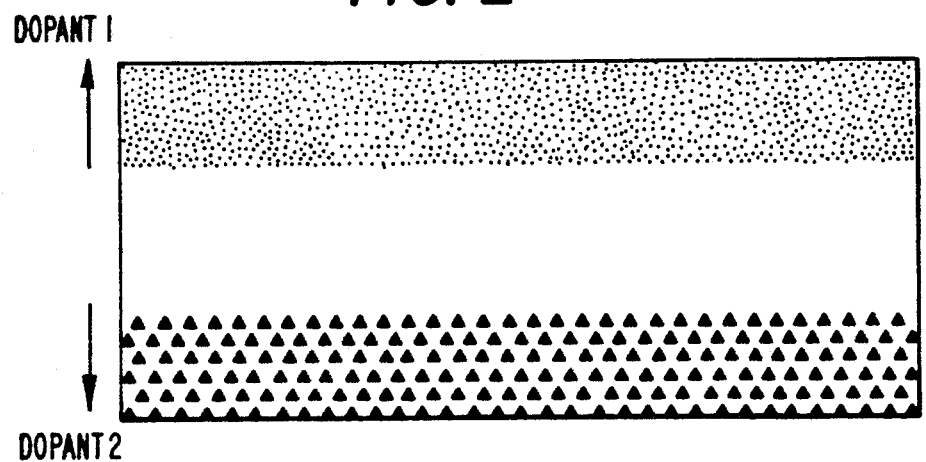
FIG. 2. illustrates a silica-gel partially impregnated with dopant on both sides.

(2) Wherein only partial impregnation is desired, such as for establishing gradients or layers of dopants within the monolith, the contacting step may be carried out by methods such as spraying, local deposition or partial immersion. FIG. 2 represents an example of a silica gel monolith doped on both sides with a different dopant.

(3) In the case of doping with multiple dopants, if the same solvent cannot be found for the different dopants desired, several doping solutions may be prepared, and the contacting step is carried out in several stages.

(4) For certain applications, it is important to mask a portion of the stabilized silica-gel monolith prior to carrying out the contacting step. The material used for the mask may be a solid device, such as a metal or plastic mask, or any substance which blocks the pores of the surface of the gel, e.g. wax or higher order polymers. The dimension of the masking substance molecule, however, should be larger then the dimension of the surface pores of the monolith. In addition, the masking material is preferably completely inert and does not react chemically with either the dopant or the solvent. For applications of the present invention where masking is used, the contacting step may be carried out, for example, through spraying.

Figure 3:
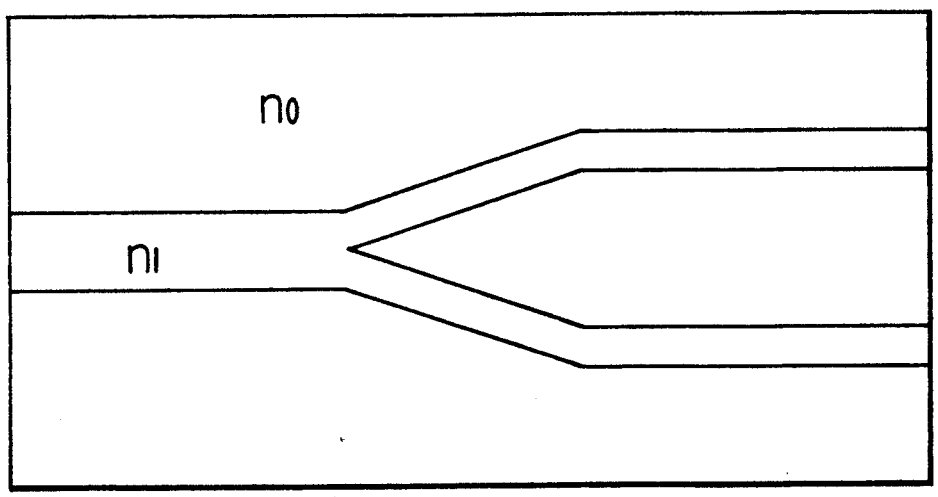
FIG. 3. illustrates an example of doping with a mask.

FIG. 3 provides an example of an optical device obtained by first forming a mask on the surface of the monolith and then spraying the masked surface with a dopant to form an area of the surface of the monolith having a different index of refraction than the remainder of the monolith. In this particular example, "$n_0$" would be the index of refraction for a pure silica-gel monolith and "$n_1$" would be the index of refraction for the portion of the monolith containing a dopant. Under these conditions, "n" is usually higher than "$n_0$". The mask may be removed from the doped monolith by melting the mask, chemical etching or mechanical removal.

(e) In addition to the above basic steps, the surface porosity of the doped monolith is preferably sealed or densified. In some cases, in order to thoroughly entrap the dopants within the gel matrix, the doped silica-gel matrix should be subjected to surface sealing such as by thermal gradient via localized heating, applying a polymer coating, or lower temperature densification (Td) of the surface by doping an outer layer with low valence fluxing additives, such as Na, Li, B, Pb, and the like. Further, a monolith doped with inorganic dopants is preferably densified by heating to a temperature of from about 800° to about 1300° C. (applicable to inorganic dopants).

In some applications, after doping is complete, the doped silica-gel monolith may be rinsed with the same solvent as used for the doping solution to avoid any surface deposition of dopant. The rinsing time and/or volume of solvent can vary widely with the size of the monolith to be rinsed, the solubility of the dopant in the solvent, the temperature of the monolith and the solvent, the type and amount of agitation used for the rinsing step and the like.

The following examples are illustrative of the present invention, constituting preferred embodiments, and are not meant to limit the invention.

EXAMPLE 1

Production of Transition and Rare Earth Element Doped Silica Gel Monoliths (Inorganic Doping).

1. Preparation of and stabilizing the ultraporous silica-gel matrix

About 60 cc (1N) $HNO_3$ (nitric acid) was added to 340 cc of distilled water at room temperature and mixed for 5 minutes with a magnetic stirrer. 200 cc of tetramethylorthosilicate (TMOS) were added to the solution while continuing to mix vigorously. The solution temperature was increased to 82°-83° C. for no more than 60 minutes.

The intimately mixed sol was then poured, or cast from the heated vessel into a polystyrene mold (60 cc; 20 mm-H×100 mm-D) at room temperature. The length of time for casting was no longer than 110 minutes.

Gelation occurred in the mold at 55° C. in 115 minutes with the resulting solid gel object taking the shape and surface finish of the mold.

The solid was aged in the mold initially at 55° C. for 10 hours, followed by an increase to 80° C. for 15 hours.

The aged pure silica-gel solid was then removed from the mold and dried in a drying chamber (container) which controlled the evapoartion rate. Drying was initiated at a temperature of 70° C. while gradually increasing the temperature to 160° C. during a 90 hour period.

The resulting ultraporous dried silica gel matrix was converted to a stabilized monolith by heating from a temperature of 150° C. up to a temperature of 1150° C. over a period of about 3 days. The sample was taken out of the furnace at the end of the heating program.

2. Preparation of the doping solution:

One gram-percent solutions of a transition element compound in deionized water and three gram-percent solutions of a rare earth element compound in deionized water were prepared for doping or impregnating stabilized monoliths produced according to step 1. The transition element compounds used to produce the one gram-percent solutions included cobalt nitrate, nickel nitrate, and copper nitrate. The rare earth element compounds used to produce the three gram-percent solutions included neodynium nitrate and erbium nitrate.

3. Impregnation:

Each of the doping solutions produced in step 2 was used to impregnate a stabilized monolith from step 1 by immersing the monolith into the doping solution for about 24 hours. During immersion, the interface between the liquid and the voids of the monolith visibly migrated from the exterior surface of the monolith into the center of the monolith.

4. Final Drying:

After impregnation, the doped gels were placed in a drying oven at 200° C. for 12 hours to remove the solvent from the pores of the doped monoliths.

5. Densification:

The fully dried silica-gel monoliths, doped with a transition or rare earth element, were heated to 400° C. to eliminate any residual nitrate via conversion to its gaseous oxides. Additional densification was achieved by heating from 400° to 1300° C.

EXAMPLE 2

Production of an Organic-Doped Pure Silica Gel Monolith (Organic Doping)

1. Preparation of and stabilizing the ultraporous matrix:
Same as Specific Example 1 above.
2. Preparation of the doping solution:
About 0.1 g. of Flavanol [$C_{15}H_{10}O_3$], the solute, was dissolved in 40 cc of a toluene solvent, and the resultin doping solution was stirred for 24 hours.
3. Impregnation:
The ultraporous, stabilized silica-gel monolith from step 1 above was immersed in the doping solution prepared in step 2 above for 24 hours at room temperature. During the contacting step, a minimum surface contact between the monolith and the container was maintained to avoid differential diffusion of the dopant from the doping solution into the monolith structure.
4. Final Drying:
The doped monolith was then dried in a renewed air atmosphere at room temperature over a period of about 24 hours.
5. Characterization:
The characterization of the doped gel was performed by transmission and absorption analysis with an ultraviolet, visible and near infrared (UF-VIS-NIR) spectrometer. The actual doping of the monolith and the homogeneity of the dopant within the monolith was thus verified.

What is claimed is:

1. A method of fabricating monolithic silica objects having dopants therein, comprising the steps of:
   (a) preparing at least one doping solution comprising a solvent having dissolved therein one or more inorganic or organic dopants;
   (b) preparing an ultraporous, dried silica-gel matrix;
   (c) stabilizing said dried silica-gel matrix by subjecting said dried silica-gel matrix to a heat treatment to produce an ultraporous, stabilized silica-gel monolith;
   (d) contacting said ultraporous, stabilized silica-gel monolith with at least one of said doping solutions to produce a doped silica-gel monolith;
   (e) drying said doped silica-gel monolith.

2. A method of fabricating monolithic silica objects having dopants therein according to claim 1, further comprising sealing the surface porosity of said doped silica-gel monolith.

3. A method of fabricating monolithic silica objects having dopants therein according to claim 2, wherein said sealing is carried out by subjecting the surface porosity of said doped silica-gel monolith to localized heating.

4. A method of fabricating monolithic silica objects having dopants therein according to claim 2, wherein said sealing is carried out by applying a polymer coating onto the surface porosity of said doped silica-gel monolith.

5. A method of fabricating monolithic silica objects having dopants therein according to claim 2, wherein said sealing is carried out by subjecting said monolith to low temperature densification with surface doping of low valence fluxing additives.

6. A method of fabricating monolithic silica objects having dopants therein according to claim 1, further comprising densifying said doped silica-gel monolith by heating said monolith up to a temperature of about 800° to about 1300° C.

7. A method of fabricating monolithic silica objects having dopants therein according to claim 1, wherein said ultraporous, stabilized silica-gel monolith possesses both open porosity and optical properties.

8. A method of fabricating monolithic silica objects having dopants therein according to claim 1, wherein said heat treatment is carried out at a temperature which produces a gel structure with open porosity but with enough strength to withstand subsequent doping.

9. A method of fabricating monolithic silica objects having dopants therein according to claim 8, wherein said temperature is from about 150° to about 1150° C.

10. A method of fabricating monolithic silica objects having dopants therein according to claim 9, wherein said temperature is 500° to about 1150° C.

11. A method of fabricating monolithic silica objects having dopants therein according to claim 1, wherein said dopant is a transition element selected from the group consisting of Ag, Al, Au, Ba, Co, Cr, Cu, Fe, Mn, Nb, Ni, Pb, Ti, V and Zr.

12. A method of fabricating monolithic silica objects having dopants therein according to claim 1, wherein said dopant is a rare earth element selected from the group consisting of Er, Ce and Nd.

13. A method of fabricating monolithic silica objects having dopants therein according to claim 1, wherein said dopant is a non-linear optic compound.

14. A method of fabricating monolithic silica objects having dopants therein according to claim 1, wherein said dopant is a dye.

15. A method of fabricating monolithic silica objects having dopants therein according to claim 1, wherein said dopant is a laser dye.

16. A method of fabricating monolithic silica objects having dopants therein according to claim 1, wherein said stabilized silica-gel monolith is contacted with at least one doping solution by immersing said monolith in said at least one doping solution.

17. A method of fabricating monolithic silica objects having dopants therein according to claim 16, wherein said stabilized silica-gel monolith is immersed in said at least one doping solution under pressure or in a vacuum.

18. A method of fabricating monolithic silica objects having dopants therein according to claim 16, wherein said stabilized silica-gel monolith is immersed in said at least one doping solution while subjecting said doping solution to mechanical or ultrasonic stirring.

19. A method of fabricating monolithic silica objects having dopants therein according to claim 1, wherein said stabilized silica-gel monolith is only partially contacted with a doping solution by spraying, local deposition or partial immersion.

20. A method of fabricating monolithic silica objects having dopants therein according to claim 1, further comprising masking a portion of the stabilized silica-gel monolith prior to contacting with said doping solution and then contacting the masked, stabilized silica-gel monolith with a doping solution.

21. A method of fabricating monolithic silica objects having dopants therein according to claim 1, wherein said stabilized silica-gel monolith is contacted with more than one doping solution.

* * * * *